(12) United States Patent
Winkler

(10) Patent No.: US 7,717,622 B2
(45) Date of Patent: May 18, 2010

(54) ROLLER BEARING FOR LINEAR MOVEMENTS

(75) Inventor: Thomas Winkler, Sulzbach (DE)

(73) Assignee: Schaeffler KG, Herzogenaurach (DE)

(*) Notice: Subject to any disclaimer, the term of this patent is extended or adjusted under 35 U.S.C. 154(b) by 474 days.

(21) Appl. No.: 11/721,197

(22) PCT Filed: Nov. 10, 2005

(86) PCT No.: PCT/EP2005/012026

§ 371 (c)(1),
(2), (4) Date: Jul. 26, 2007

(87) PCT Pub. No.: WO2006/061076

PCT Pub. Date: Jun. 15, 2006

(65) Prior Publication Data

US 2008/0138001 A1    Jun. 12, 2008

(30) Foreign Application Priority Data

Dec. 9, 2004 (DE) ................ 10 2004 059 275

(51) Int. Cl.
*F16C 29/06* (2006.01)
(52) U.S. Cl. .................................. 384/45; 384/15
(58) Field of Classification Search ........... 384/43–45, 384/14, 55, 15
See application file for complete search history.

(56) References Cited

U.S. PATENT DOCUMENTS

| | | | | |
|---|---|---|---|---|
| 3,940,186 A | * | 2/1976 | Nilsson | ........................ 384/45 |
| 4,615,569 A | * | 10/1986 | Hirata | ........................ 384/45 |
| 5,059,037 A | | 10/1991 | Albert et al. | |
| 5,431,498 A | | 7/1995 | Lyon et al. | |
| 5,800,065 A | | 9/1998 | Lyon et al. | |
| 6,174,084 B1 | * | 1/2001 | Pauwels et al. | ................ 384/8 |
| 6,960,022 B2 | * | 11/2005 | Beatson et al. | ................ 384/39 |

FOREIGN PATENT DOCUMENTS

| | | |
|---|---|---|
| DE | 2626399 Y | 12/1977 |
| DE | 4041269 Y | 3/1992 |
| DE | 9313728 Y | 11/1993 |
| DE | 19615723 A | 10/1997 |
| DE | 198 41 668 A | 3/2000 |
| DE | 20121660 Y | 3/2003 |
| EP | 0359121 Y | 3/1990 |

* cited by examiner

*Primary Examiner*—Thomas R Hannon
(74) *Attorney, Agent, or Firm*—Lucas & Mercanti, LLP

(57) ABSTRACT

The invention relates to a roller bearing for linear movements, said roller bearing comprising a guiding carriage which is essentially C-shaped in the cross-section thereof, is displaceably guided on a guiding rail in the longitudinal direction thereof, and comprises two lateral limbs. The carrier body of the roller bearing is supported in the region of each lateral limb in such a way that it can be displaced on the guiding rail by means of at least one series of rolling bodies. The series of rolling bodies respectively comprises a load-transmitting row of rolling bodies, which engages with a load-carrying running path of the carrier body and a load-carrying running path of the guiding rail, in addition to an inverted row of rolling bodies and two defecting rows of rolling bodies. In order to form the load-carrying running path of the carrier body, a running path element is provided parallel to the longitudinal direction of the guiding rail. According to the invention, the running path element is embodied as a hardened sheet metal element which is arranged and fixed in a receiving region on the respective lateral limbs of the carrier body.

3 Claims, 2 Drawing Sheets

ROLLER BEARING FOR LINEAR MOVEMENTS

FIELD OF THE INVENTION

The invention relates to a roller bearing for linear movements, comprising a guiding carriage which is displaceably guided on a guiding rail in the longitudinal direction thereof, is essentially C-shaped in cross section and has two side limbs, and whose carrying element is displaceably supported in the region of each side limb on the guide rail by means of at least one series of rolling bodies, the series of rolling bodies having a load transmitting row of rolling bodies which is in engagement with a load receiving raceway of the supporting body and a load receiving raceway of the guide rail, as well as having a row of return-movement rolling bodies and two rows of deflecting rolling bodies, in which case in order to form the load receiving raceway of the supporting body a raceway element which is parallel to the longitudinal direction of the guide rail is provided.

BACKGROUND OF THE INVENTION

In order to manufacture a roller bearing for linear movements it is necessary to construct the raceways of this bearing with a sufficient hardness so as to achieve an appropriate service life. As a rule, this is done by heat treatment, for example by carburizing, induction hardening or else through hardening. However, this procedure has the disadvantage that an additional separate working step is necessary between the soft processing and the hard processing and only materials which can be hardened can be used. Furthermore, a hardening offset can occur which influences in particular the position of the return bores of the guiding carriage.

Document DE 93 13 728 U1 discloses a linear roller bearing arrangement with integrated raceway elements of the type mentioned at the beginning. However, said document has the disadvantage that the raceway elements of the guiding carriage cannot be manufactured from sheet metal—as is apparent from the cross-sectional illustration—and that the receptacle area of the supporting body is also constructed in a disadvantageous way insofar as it forms, in cross section, an outwardly directed prism, which very greatly weakens the supporting body in terms of its rigidity.

SUMMARY OF THE INVENTION

The invention is based on the object of developing a rolling body for linear movements in such a way that its supporting body is weakened to a far lesser degree compared to the previously known prior art. In this context, it is to be possible to dispense with a separate working step for hardening. Likewise, it is to be possible to use materials which cannot be hardened.

This object is achieved according to the invention in that the raceway element is embodied as a hardened sheet metal element which is fitted and secured in a receptacle area on the respective side limb of the supporting body. Each receptacle area of the supporting body can be constructed in the manner of a prism in cross section and be directed toward the inside in a roof shape with respect to the guide rail.

This permits large cost savings. It also provides the possibility of using lightweight materials. General machine engineering and handling technology is possible as the field of application of such a linear guiding means, inter alia also applications in which the precision requirements are less significant.

In order to manufacture this linear roller bearing it is appropriate to no longer harden the complete supporting body but rather to insert each of the hardened sheet metal elements into a defined receptacle area of the supporting body. The sheet metal elements can be manufactured separately by means of a high-precision sheet metal shaping process, hardened and subsequently cleaned. Grinding can be dispensed with so that the manufacture of the sheet metal elements is efficient and cost effective overall.

The supporting body is processed exclusively in the soft state. Its prism-like receptacle areas have to be fine worked in order to provide sufficiently accurate receptacle dimensions for the sheet metal elements.

BRIEF DESCRIPTION OF THE DRAWING

Exemplary embodiments of the invention are illustrated in the drawing and will be described in more detail below.

In said drawing.

DETAILED DESCRIPTION OF THE DRAWING

Figure 1:
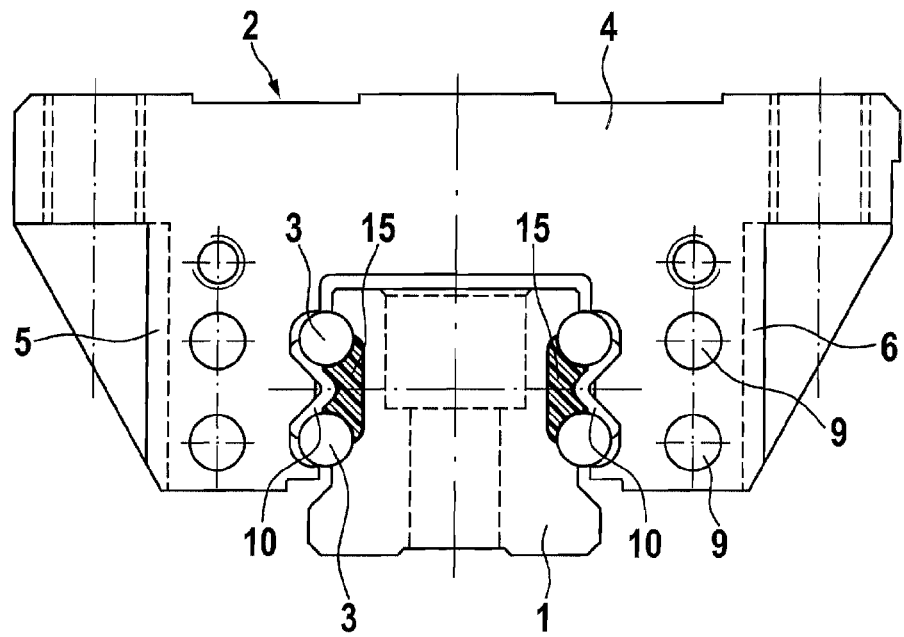
FIG. 1 shows a guide rail and a supporting body—supported thereon by means of rolling bodies—of a linear roller bearing according to the invention, in a front view.
Figure 2:
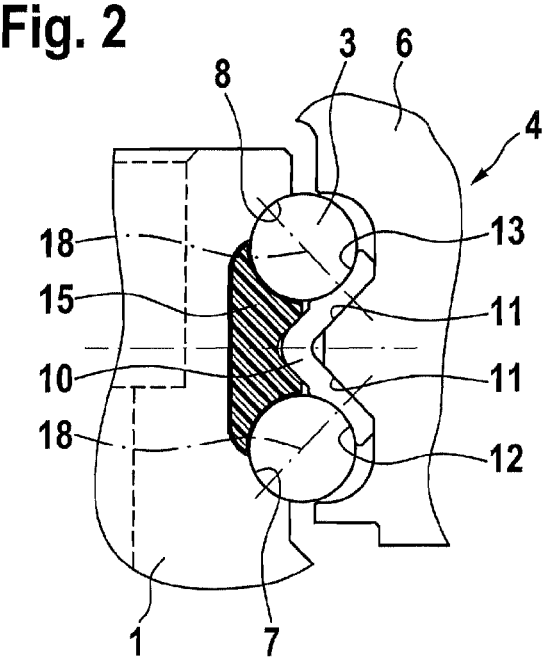
FIG. 2 shows the right hand side supporting area in an illustration which is enlarged compared to FIG. 1.
Figure 3:
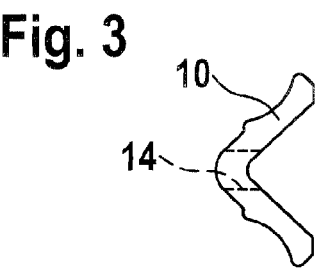
FIG. 3 shows the sheet metal element from FIG. 2 in a front view.
Figure 4:
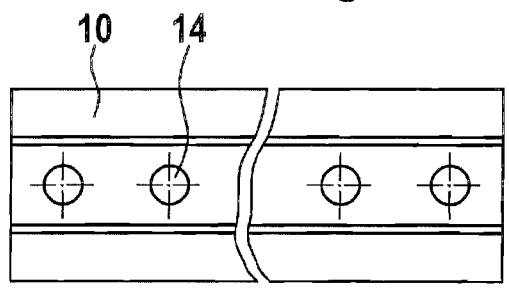
FIG. 4 shows the sheet metal element in a longitudinal side view.
Figure 5:
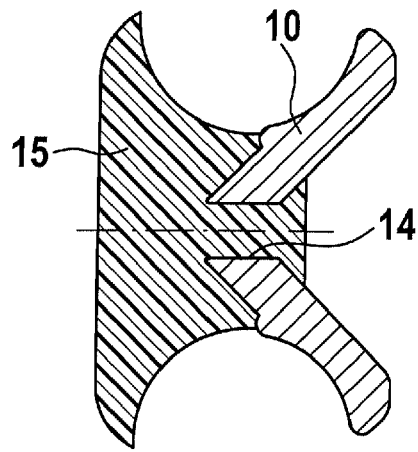
FIG. 5 shows a cross section through a single-piece component which is composed of the sheet metal element and a plastic element which is provided through encapsulation by injection molding, the sectional plane of which component runs through a bore of the sheet metal element.
Figure 6:
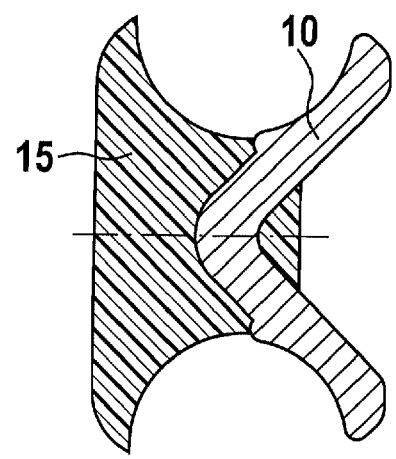
FIG. 6 shows the component according to FIG. 5 in an illustration with a cross-sectional plane which is displaced in parallel out of the bore.

A roller bearing (illustrated in FIGS. 1 to 6) for linear movements is composed of a guide rail 1 on which a guiding carriage 2 is supported in a longitudinally displaceable fashion. The support is carried out with series of rolling bodies 3 which are balls in the exemplary embodiment. The guiding carriage 2 contains a supporting body 4 which is embodied in an approximately C shape in cross section or in a frontal view and partially surrounds the guide rail 1, with two side limbs 5 and 6 of the supporting body 4 of the guiding carriage 2 being adjacent to the lateral longitudinal sides of the guiding rail 1.

Two endless series of rolling bodies 3 are located on each of the side limbs 5 and 6. They are arranged one on top of the other, as can be seen in FIG. 1. Wherein the rolling bodies 3 of each load transmitting row of rolling bodies are supported on a lower load receiving raceway 7 or on an upper load receiving raceway 8, respectively, of the guide rail 1. Each load receiving raceway 7 or 8 is connected to a row of return-movement rolling bodies by means of two deflecting rows of rolling bodies (not illustrated) so that endless series of rolling bodies are produced. Return ducts 9 are provided in the supporting body 4 in order to accommodate the rows of return-movement rolling bodies.

In order to support the rolling bodies 3 of the load transmitting rows of rolling bodies on the supporting body, the invention provides hardened sheet metal elements 10 which are fitted into receptacle areas 11 of the side limb 5 or 6 of the supporting body 4 and secured there. The receptacle areas 11 are in the shape of a prism and each have a roof shape which is directed at the guide rail 1. On its side facing away from the receptacle area 11 and facing the guide rail 1, each sheet metal element 10 has a lower load receiving raceway 12 and an upper load receiving raceway 13 of the supporting body 4 for the rolling bodies 3 of the load transmitting rows of rolling bodies. In order to retain the rolling bodies on the guiding carriage 2, each sheet metal element 10 has bores 14 and is encapsulated by injection molding with a plastic element 15 which fills in the bores 14.

Figure 7:
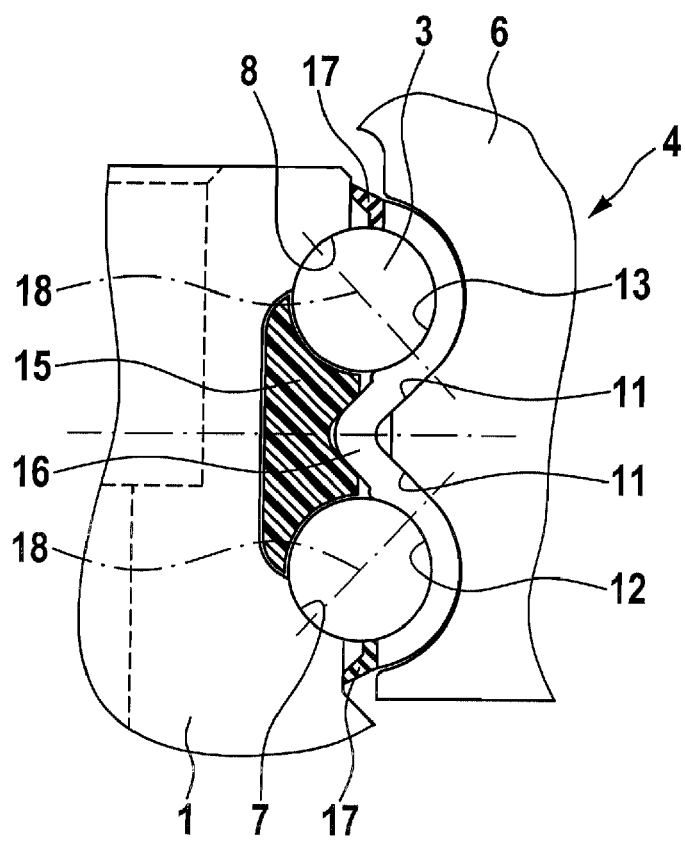
FIG. 7 shows an illustration which corresponds to FIG. 2, with a modified sheet metal element.
Figure 8:
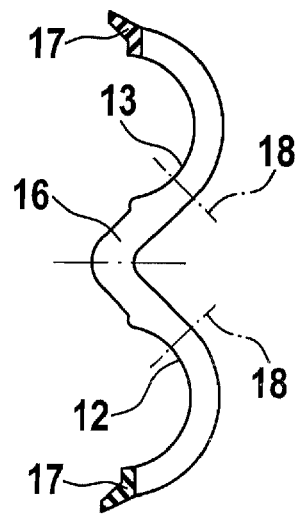
FIG. 8 shows the modified sheet metal element according to FIG. 7.

In FIGS. 7 and 8, the inventive roller bearing for linear movements has a modified sheet metal element 16 to which two longitudinal sealing strips 17 are secured. The latter bear against the adjacent longitudinal side of the guide rail 1 and close off from the outside the space in which the rolling bodies 3 are located.

The element 15 for retaining the rolling bodies which is made of plastic extends over the entire length of the raceways 12 and 13 of the supporting body 4. It is connected to sheet metal element 10 or 16 in a formfitting manner by providing the sheet metal element with the bores 14 between the raceways 12 and 13 during the shaping process for its manufacture. The encapsulation by injection molding with the plastic integrally connects the sheet metal element 10 or 16 to the means of retaining the rolling bodies. This leads to a simplification of the assembly process and thus to a saving in costs.

In order to improve the sealing for the guiding carriage 2, it is necessary to provide the longitudinal sealing strips 17. These can be composed of rubber and extend over the entire length of the guiding carriage 2. They are respectively arranged as close as possible above the upper raceway and the lower raceway. The described sheet metal element is modified in FIGS. 7 and 8 with respect to the sheet metal element 16 by virtue of the fact that the raceway areas 12 and 13 are extended in the radial direction around the rolling bodies 3 so that an area is produced to which a longitudinal sealing strip 17 can be fixed. The radius of the 180° wrap around of the sheet metal element 16 is selected such that the rolling body is in contact with the raceway area 12 or 13 at just one point in the direction of the load transmitting plane 18 and is otherwise exposed. It is proposed to vulcanize the longitudinal sealing strip 17, which is composed of rubber, to the sheet metal element 16. Consequently, a secure composite is possible and formation of the selected components into one piece is achieved. This also produces cost savings in terms of assembly and improving the effectiveness of the longitudinal seals.

REFERENCE NUMERALS

1 Guide rail
2 Guiding carriage
3 Rolling body
4 Supporting body
5 Side limb
6 Side limb
7 Lower load receiving raceway of the guide rail
8 Upper load receiving raceway of the guide rail
9 Return duct
10 Sheet metal element
11 Receptacle area
12 Lower load receiving raceway of the supporting body
13 Upper load receiving raceway of the supporting body
14 Bore
15 Plastic element
16 Sheet metal element
17 Longitudinal sealing strip
18 Load transmitting plane

The invention claimed is:

1. A roller bearing for linear movements, comprising:
a guiding carriage which is displaceably guided on a guide rail in a longitudinal direction thereof, the carriage having a supporting body that is essentially C-shaped in cross-section and has two side limbs, the supporting body is displaceably supported in a region of each side limb on the guide rail by means of at least one series of rolling bodies, the series of rolling bodies having one load transmitting row of rolling bodies each which is in engagement with a load receiving raceway of the supporting body and a load receiving raceway of the guide rail, as well as having a row of return-movement rolling bodies and two rows of deflecting rolling bodies,
wherein in order to form the load receiving raceway of the supporting body a raceway element which is parallel to the longitudinal direction of the guide rail is provided, the raceway element is embodied as a hardened sheet metal element which is fitted and secured in a receptacle area on the respective side limb of the supporting body, and
wherein each receptacle area of the supporting body is constructed as a prism in cross-section and is directed toward an inside in a roof shape with respect to the guide rail.

2. The roller bearing as claimed in claim 1, wherein the sheet metal element has bores and is encapsulated by injection molding with a plastic element which fills in the bores and has the purpose of retaining the rolling body.

3. The rolling body as claimed in claim 1, further comprising flexible longitudinal sealing strips which are each secured to a sheet metal element and are arranged so as to bear against the adjacent longitudinal side of the guide rail are provided on the supporting body of the guiding carriage.

* * * * *